United States Patent
Osotio et al.

(10) Patent No.: US 12,039,108 B2
(45) Date of Patent: *Jul. 16, 2024

(54) DATA AND USER INTERACTION BASED ON DEVICE PROXIMITY

(71) Applicant: Microsoft Technology Licensing, LLC, Redmond, WA (US)

(72) Inventors: Neal Osotio, Sammamish, WA (US); Eun Hyung Kim, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/105,783

(22) Filed: Feb. 3, 2023

(65) Prior Publication Data

US 2023/0176661 A1   Jun. 8, 2023

Related U.S. Application Data

(63) Continuation of application No. 17/384,891, filed on Jul. 26, 2021, now Pat. No. 11,599,201, which is a (Continued)

(51) Int. Cl.
  *G06F 3/01* (2006.01)
  *G06F 16/9535* (2019.01)
  (Continued)

(52) U.S. Cl.
  CPC .............. *G06F 3/017* (2013.01); *G06F 3/011* (2013.01); *G06F 16/9535* (2019.01);
  (Continued)

(58) Field of Classification Search
  CPC ...... G06F 3/017; G06F 3/011; G06F 16/9535; G06F 2203/04806; G06Q 30/0261; G06Q 30/0269
  See application file for complete search history.

(56) References Cited

U.S. PATENT DOCUMENTS 5,467,413 A   11/1995   Barrett
6,006,265 A   12/1999   Rangan et al.
(Continued)

FOREIGN PATENT DOCUMENTS

CA   2708197 A1   12/2011
CN   1430530 A   7/2003
(Continued)

OTHER PUBLICATIONS

Andy Greenberg, Touchless Tech, Jul. 11, 2008, https://www.forbes.com/ (Year: 2008).*

(Continued)

*Primary Examiner* — E Carvalho
(74) *Attorney, Agent, or Firm* — Calfee, Halter & Griswold LLP

(57) ABSTRACT

Architecture that enables the detection of a user by a user device and interaction with content of the user device by the user before the user physically contacts the device. The detection capability can utilize one or more sensors of the device to identify the user and the proximity (distance) of the user to the device. Based on the user identity and the proximity, the device operates/functions in a certain way. Moreover, ongoing interaction can be enabled by recognition of a natural user interface (NUI) gestures, alone or in combination with other recognition techniques (e.g., speech recognition). Device activity can include causing the device to operate in predetermined ways such as power modes, application launching and manipulation to cause control of hardware and other software (local and/or remote) and, obtaining and presenting specific types of content (e.g., advertisements, notifications, messages, reminders, news, incoming communications, etc.).

20 Claims, 14 Drawing Sheets

Related U.S. Application Data continuation of application No. 13/645,526, filed on Oct. 5, 2012, now Pat. No. 11,099,652.

(51) Int. Cl.
  *G06Q 30/0251* (2023.01)
  *G06Q 50/00* (2012.01)

(52) U.S. Cl.
  CPC ..... *G06Q 30/0261* (2013.01); *G06Q 30/0269* (2013.01); *G06F 2203/04806* (2013.01); *G06Q 50/01* (2013.01)

(56) References Cited

U.S. PATENT DOCUMENTS

| | | |
|---|---|---|
| 6,089,975 A | 7/2000 | Dunn |
| 6,119,123 A | 9/2000 | Elenbaas et al. |
| 7,035,803 B1 | 4/2006 | Ostermann et al. |
| 7,043,521 B2 | 5/2006 | Eitel |
| 7,103,642 B1 | 9/2006 | Chen et al. |
| 7,167,903 B2 | 1/2007 | Percival |
| 7,342,587 B2 | 3/2008 | Danzig et al. |
| 7,460,130 B2 | 12/2008 | Salganicoff |
| 7,494,053 B1 | 2/2009 | Burns |
| 7,594,177 B2 | 9/2009 | Jojic et al. |
| 7,836,403 B2 | 11/2010 | Viswanathan et al. |
| 7,912,915 B1 | 3/2011 | Brin |
| 8,229,911 B2 | 7/2012 | Bennett |
| 8,327,273 B2 | 12/2012 | Christianson et al. |
| 8,381,105 B2 | 2/2013 | Chand et al. |
| 9,298,840 B2 | 3/2016 | Chand |
| 11,099,652 B2 | 8/2021 | Osotio et al. |
| 2002/0097983 A1 | 7/2002 | Wallace et al. |
| 2002/0133828 A1 | 9/2002 | Foster |
| 2002/0161909 A1 | 10/2002 | White |
| 2003/0028285 A1 | 2/2003 | Zura et al. |
| 2003/0030659 A1 | 2/2003 | Wu |
| 2003/0078840 A1 | 4/2003 | Strunk et al. |
| 2003/0090515 A1 | 5/2003 | Chang et al. |
| 2004/0221322 A1 | 11/2004 | Shen et al. |
| 2005/0010647 A1 | 1/2005 | Durham |
| 2005/0204276 A1 | 9/2005 | Hosea et al. |
| 2005/0229200 A1* | 10/2005 | Kirkland ............... G06F 3/0481 725/12 |
| 2006/0048191 A1 | 3/2006 | Xiong |
| 2006/0244768 A1 | 11/2006 | Witwer |
| 2006/0285821 A1 | 12/2006 | Kim et al. |
| 2007/0112761 A1 | 5/2007 | Xu et al. |
| 2007/0130015 A1 | 6/2007 | Starr et al. |
| 2007/0211027 A1 | 9/2007 | Ohta |
| 2007/0266305 A1 | 11/2007 | Cong et al. |
| 2008/0168040 A1 | 7/2008 | Jones et al. |
| 2008/0201242 A1 | 8/2008 | Minnis et al. |
| 2008/0209340 A1 | 8/2008 | Tonse et al. |
| 2008/0209350 A1 | 8/2008 | Sobotka et al. |
| 2009/0013288 A1 | 1/2009 | Scheflan |
| 2009/0204901 A1 | 8/2009 | Dharmaji et al. |
| 2009/0217211 A1 | 8/2009 | Hildreth et al. |
| 2009/0237372 A1 | 9/2009 | Kim et al. |
| 2009/0254855 A1 | 10/2009 | Kretz et al. |
| 2009/0282021 A1 | 11/2009 | Bennett |
| 2009/0299964 A1 | 12/2009 | Cameron et al. |
| 2009/0300554 A1 | 12/2009 | Kallinen |
| 2009/0327913 A1 | 12/2009 | Adar et al. |
| 2010/0037138 A1 | 2/2010 | Shcherbakov et al. |
| 2010/0095345 A1 | 4/2010 | Tran et al. |
| 2010/0145941 A1 | 6/2010 | Vasudevan et al. |
| 2010/0241962 A1 | 9/2010 | Peterson et al. |
| 2010/0271177 A1 | 10/2010 | Pang et al. |
| 2010/0299325 A1 | 11/2010 | Tzvi et al. |
| 2011/0078582 A1 | 3/2011 | Christianson et al. |
| 2011/0087966 A1 | 4/2011 | Leviathan |
| 2011/0150276 A1 | 6/2011 | Eckhoff et al. |
| 2011/0179154 A1 | 7/2011 | Ravichandran et al. |
| 2011/0246906 A1 | 10/2011 | Catlin et al. |
| 2011/0270947 A1 | 11/2011 | Cok et al. |
| 2011/0282867 A1 | 11/2011 | Palermiti, II et al. |
| 2011/0295699 A1 | 12/2011 | Flinn et al. |
| 2012/0131454 A1 | 5/2012 | Shah |
| 2012/0135684 A1 | 5/2012 | Shrum, Jr. et al. |
| 2012/0150650 A1 | 6/2012 | Zahand |
| 2012/0287163 A1 | 11/2012 | Djavaherian |
| 2013/0006952 A1 | 1/2013 | Wong et al. |
| 2013/0029723 A1 | 1/2013 | Das et al. |
| 2013/0057553 A1* | 3/2013 | Chakravarthula .... G06F 3/0484 345/472 |
| 2013/0080911 A1 | 3/2013 | Klemm |
| 2013/0104059 A1 | 4/2013 | Bennett et al. |
| 2013/0290827 A1 | 10/2013 | Smith et al. |
| 2013/0290862 A1 | 10/2013 | Chand et al. |
| 2014/0019441 A1 | 1/2014 | Shieh et al. |
| 2014/0100955 A1 | 4/2014 | Osotio et al. |
| 2021/0349543 A1 | 11/2021 | Osotio et al. |

FOREIGN PATENT DOCUMENTS

| | | |
|---|---|---|
| WO | 2007057843 A1 | 5/2007 |
| WO | 2007071773 A1 | 6/2007 |
| WO | 2009146087 A1 | 12/2009 |

OTHER PUBLICATIONS

Denis Gouin, Valérie Lavigne, Trends in Human-Computer Interaction to Support Future Intelligence Analysis Capabilities, 16th International Command and Control Research and Technology Symposium (Year: 2010).*

Hablani, Ashish, "Microsoft Kinect NUAds: Introducing Gesture Based Interactive Ads", Retrieved from: http://marketingfaq.net/2012/06/microsoftkinectnuads/, Jun. 15, 2012.

Baker, Rosie, "Xbox launches gesture controlled ads", Retrieved from: http://www.marketingweek.co.uk/news/xbox-launches-gesture-controlled-ads/4002217.article, Jun. 14, 2012.

Rehman, A., "Wave Control Uses Proximity Sensor to Allow Touch-Free Music Playback [Android]", Retrieved from: http://www.addictivetips.com/mobile/wave-control-android-touch-free-music-playback-via-proximity-sensor/, Apr. 10, 2012.

"PointGrab: The Start-Up Bringing Gesture Recognition to Window 8 Devices", Retrieved from: http://officialandreascy.blogspot.in/2012/07/pointgrab-start-up-bringing-gestrure.html, Jun. 30, 2012.

Pagan, Brian, "New Design Practices for Touch-free Interactions", Retrieved from: http://uxmag.com/article/new-design-practices-for-touch-free-interactions, May 7, 2012.

"International Search Report and Written Opinion for PCT Patent Application No. PCT/US2013/060240", dated Jan. 16, 2014, 11 Pages.

Vogel, et al., "Interactive Public Ambient Displays: Transitioning from Implicit to Explicit, Public to Personal, Interaction with Multiple Users", In Proceedings of the 17the Annual ACM Symposium on User Interface Software and Technology, Oct. 24, 2004, 10 Pages.

"Non-Final Office Action for United States U.S. Appl. No. 13/645,526", dated Oct. 6, 2014, 14 Pages.

"Reply to Non-Final Office Action for U.S. Appl. No. 13/645,526", dated Jan. 16, 2015, 17 Pages.

"Final Office Action for United States U.S. Appl. No. 13/645,526", dated May 22, 2015, 18 Pages.

"Reply to Final Office Action for U.S. Appl. No. 13/645,526", dated Jul. 24, 2015, 17 Pages.

"Non-Final Office Action for U.S. Appl. No. 13/645,526", dated Oct. 22, 2015, 15 Pages.

"Reply to Non-Final Office Action for U.S. Appl. No. 13/645,526", dated Mar. 16, 2016, 26 Pages.

"Final Office Action for U.S. Appl. No. 13/645,526", dated Jul. 5, 2016, 23 Pages.

"Reply to Final Office Action for U.S. Appl. No. 13/645,526", dated Sep. 6, 2016, 25 Pages.

"Advisory Action for U.S. Appl. No. 13/645,526", dated Sep. 30, 2016, 3 Pages.

(56) References Cited

OTHER PUBLICATIONS

"First Office Action and Search Report Issued in Chinese Patent Application No. 201380051761.3", dated Nov. 21, 2016, 11 Pages.
"Non-Final Office Action for U.S. Appl. No. 13/645,526", dated Jul. 14, 2017, 21 Pages.
Notification of the 2nd Office Action for Chinese Patent Application No. 201380051761.3, dated May 17, 2017, 9 Pages.
International Search Report and Written Opinion for PCT Application No. PCT/US2013/037871, dated Oct. 17, 2013, 8 Pages.
"Web Integration Services", Deversus Software Inc., Aug. 14, 2010, 2 Pages.
"3rd Party Application Integration", ECommercePartners.net, Jan. 27, 2010, 3 Pages.
"Web Hosting Features", Yahoo! Small Business, Jun. 24, 2011, 3 Pages.
"Custom website design and coding of small business website solutions", Mar. 1, 2012, 4 Pages.
"WordPress Development", Integrated Web Services, Apr. 22, 2012, 2 Pages.
Lawrence, "jquery.videoBG", GitHub.com, Mar. 13, 2011, 9 Pages.
"Full Screen video background template v2", ActiveDen.net, Oct. 23, 2009, 7 Pages.
"Animation Features", Pearson Education Inc., 2005, 2 Pages.
"hotFlashVideo", Flashloaded.com, Mar. 2, 2011, 2 Pages.
Hendrickson, "Asterpix Video Hotspots Now Generated Automatically", TechCrunch.com, Mar. 5, 2008, 2 Pages.
Liu, "A Fast Image Segmentation Algorithm for Interactive Video Hotspot Retrieval", In IEEE Workshop on Content-Based Access of Image and Video Libraries, Dec. 14, 2001, pp. 3-8.
Zeman, "YouTube Insight HotSpots: Reviewing Viewer Attention for Entertainment & Informative Video", TubularInsights.com, Sep. 2, 2011, 5 Pages.
Aclaro, "How to Make Web Video with an Embedded Hotspot Button", Jan. 21, 2012, 3 Pages.
"Flash Animations over Quicktime Hotspots", Harlands, Jun. 27, 2002, 2 Pages.
"Reply to Non-Final Office Action for U.S. Appl. No. 13/645,526", dated Oct. 16, 2017, 28 Pages.
"Notice of Granting Patent for Chinese Patent Application No. 201380051761.3", dated Sep. 21, 2017, 4 Pages.
"Final Office Action for U.S. Appl. No. 13/645,526", dated Jan. 25, 2018, 24 Pages.
"Reply to Final Office Action for U.S. Appl. No. 13/645,526", dated Mar. 9, 2018, 30 Pages.
"Advisory Action for U.S. Appl. No. 13/645,526", dated Apr. 19, 2018, 5 Pages.
"Reply to Final Office Action for U.S. Appl. No. 13/645,526", dated Apr. 24, 2018, 34 Pages.
"Office Action Issued in European Patent Application No. 13777360. 2", dated Oct. 22, 2018, 8 Pages.
Clark, et al., "Seamless Interaction in Space", In Proceedings of the 23rd Australian Computer-Human Interaction Conference, Nov. 28, 2011, pp. 88-97.
"Non-Final Office Action for U.S. Appl. No. 13/645,526", dated Jan. 11, 2019, 26 Pages.
"Reply to Non-Final Office Action for U.S. Appl. No. 13/645,526", dated Apr. 11, 2019, 33 Pages.
"Final Office Action for U.S. Appl. No. 13/645,526", dated Aug. 6, 2019, 25 Pages.
"Appeal Brief for U.S. Appl. No. 13/645,526", dated Dec. 23, 2019, 56 Pages.
"Examiner's Answer to Appeal Brief for U.S. Appl. No. 13/645,526", dated Apr. 3, 2020, 17 Pages.
"Reply Brief for U.S. Appl. No. 13/645,526", dated Jun. 2, 2020, 21 Pages.
"Patent Board Decision for U.S. Appl. No. 13/645,526", dated Jan. 25, 2021, 8 Pages.
"Notice of Allowance and Fees Due for U.S. Appl. No. 13/645,526", dated Apr. 21, 2021, 5 Pages.
"Office Action for U.S. Appl. No. 17/384,891", dated Apr. 14, 2022, 9 pages.
"Response to the Office Action for U.S. Appl. No. 17/384,891", dated Jul. 14, 2022, 14 pages.
"Notice of Allowance and Fees Due for U.S. Appl. No. 17/384,891", dated Nov. 2, 2022, 7 pages.
Greenberg, Andy, "Touchless Tech", https://www.forbes.com, Jul. 11, 2008, 2 pages.
Gouin, et al., "Trends in Human-Computer Interaction to Support Future Intelligence Analysis Capabilities", In 16th International Command and Control Research and Technology Symposium, Jun. 2010, 23 pages.

* cited by examiner

DATA AND USER INTERACTION BASED ON DEVICE PROXIMITY

RELATED APPLICATIONS

This application is a continuation of U.S. patent application Ser. No. 17/384,891, filed on Jul. 26, 2021, and entitled "DATA AND USER INTERACTION BASED ON DEVICE PROXIMITY", which is a continuation of U.S. patent application Ser. No. 13/645,526, filed on Oct. 5, 2012, and entitled "DATA AND USER INTERACTION BASED ON DEVICE PROXIMITY". The entireties of these applications are incorporated herein by reference.

BACKGROUND

Typically, advertisements on technology devices are presented to the user while the user is already physically engaged in the content of a website, video, game, etc. Since the user focus is the priority for the user at the time, content such as advertisements, in general, may then be an annoyance or distraction from the focus of the user at that time. Thus, the gains hoped to be obtained by advertisers are becoming ever more limited.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables the detection of a user by a user device and interaction with content of the user device by the user before the user physically contacts the device. The detection capability can utilize one or more sensors of the device to identify the user and the proximity (distance) of the user to the device. Based on the user identity and the proximity, the device can be pre-configured/user configured to operate/function in certain ways. Moreover, ongoing interaction can be enabled by recognition of a natural user interface (NUI) gestures, alone or in combination with other recognition techniques (e.g., speech recognition).

In other words, after user identification, if the user is at a distance considered to be too far from the device, the device behaves (operates) in one way, if the user is at a distance considered to be too close to the device, the device behaves (operates) in another way, and if the user is at a distance from the device considered to be within an acceptable range from the device, the device behaves (operates) in yet another way.

For example, device behavior can include causing the device to operate in predetermined ways such as operating from one power mode (e.g., sleep) to another power mode (e.g., full power), launching an application (e.g., operating system, programs, etc.), manipulating an application(s) to cause control of hardware and other software (local and/or remote), and so on.

Other device activity (behavior) can include obtaining and presenting specific types of content such that, for example, based on the user identity, content (e.g., advertisements, notifications, messages, reminders, news, incoming communications, etc.) can be obtained and presented to the user while the user is proximate the user device.

In a specific implementation where the content is advertisements, the device enables the user to engage with targeted relevant advertisements prior to even touching the device. Through the user's hand proximity (distance of the user hand to the device) and NUI gestures, the user can view advertisements, control the number of advertisements viewed and apply actions (e.g., save, save as, etc.) to those advertisements without having been logged into the device. In turn, the advertisements would not interrupt the user focus (e.g., reading) in viewing the device display, watching a video, or playing a game once logged in.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
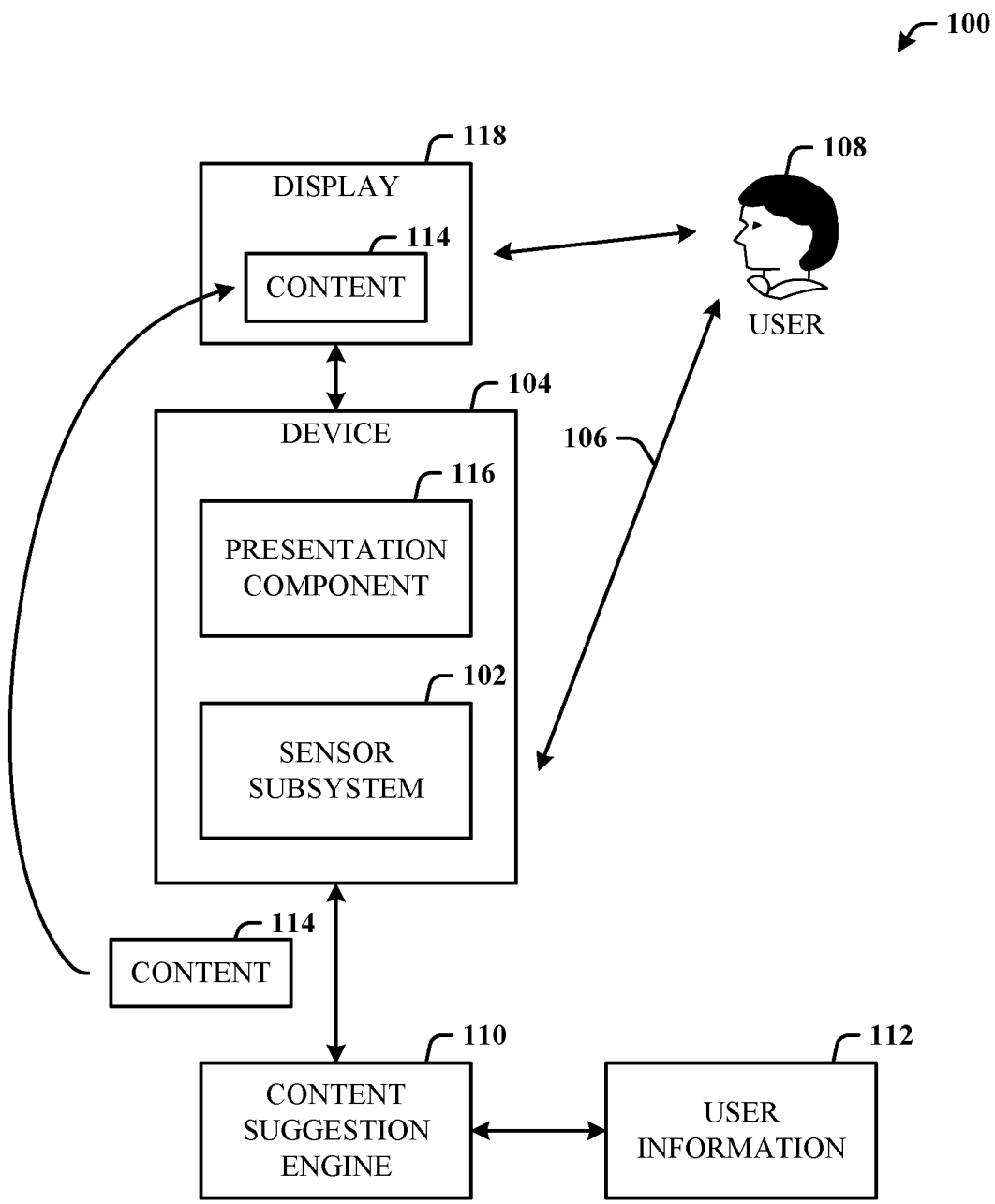
FIG. 1 illustrates a system in accordance with the disclosed architecture.

The disclosed architecture enables the detection of a user and attributes of the user by a device (public and personal) and interaction with content of the device by the user before the user physically contacts the device. The detection capability can utilize one or more sensors of the device or another sensor system to identify the user and the proximity (distance) of the user to the device. Based on the user identity and the proximity, the device can be pre-configured (e.g., by the user) to operate/function in certain ways.

Moreover, ongoing interaction thereafter can be enabled by recognition of a natural user interface (NUI) gestures, alone or in combination with other recognition techniques (e.g., speech recognition). NUI may be defined as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Thus, the NUI methods can enable interaction with a computing device that cause the computing device to perform a wide variety of operations, including, but not limited to, program navigation (e.g., dismiss (or close), open, save, browse) and power operations (e.g., sleep, standby, turn off, turn on, etc.).

Specific categories of NUI technologies include touch sensitive displays, voice and speech recognition, intention and goal understanding, motion gesture detection using depth cameras (such as stereoscopic camera systems, infrared camera systems, RGB (red-green-blue) camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG (electroencephalogram) and related methods).

In other words, after user identification, if the user is at a distance considered (e.g., by threshold detection techniques) to be too far from the device, the device behaves (operates) in one way, if the user is at a distance considered to be too close to the device, the device behaves (operates) in another way, and if the user is at a distance from the device considered to be within an acceptable range from the device, the device behaves (operates) in yet another way.

Other device activity (behavior) can include obtaining and presenting specific types of content such that, for example, based on the user identity, content (e.g., advertisements, notifications, messages, reminders, news, incoming communications, etc.) can be obtained and presented to the user while the user is proximate the device.

In a public environment, a public device can detect and identify the user, detect and identify physical characteristics of the user such as height, hair color, articles of clothing, adornments (e.g., sunglasses, shoes), body poses (e.g., arm lifted, hand and finger orientation, head nodding, standing, sitting down, etc.) and specific types of adornments (e.g., Brand A sunglasses over the eyes, Brand C coffee held in a right hand, etc.), and then forward communications to a personal user device such that the user receives targeted or customized content via the user device. For example, when implemented in an apparel business, identification of the user can result in retrieval of user information about likes/dislikes of certain types of apparel, followed by content advertisements of special sales items which can then be superimposed on a likeness of the user for viewing via the public device and/or via the personal user device (keeps the superimposed likeness away from public viewing).

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include a sensor subsystem 102 (e.g., audio input/output, image capture, video capture, temperature sensing, touch sensing, proximity sensing (e.g., sonic, infrared), speed and acceleration, geographic coordinates, gyroscope, etc.) of a device 104 (e.g., smart phone, tablet device, portable computing device, etc.) that senses non-contact (without touching) proximity 106 of a user 108 of the device 104, from the device 104. The sensor subsystem 102 also determines an identity of the user 108. This can be accomplished using image recognition of images captured by the device camera system, and more specifically, by facial recognition.

A content suggestion engine 110 receives user information 112 (e.g., user profile data, user social network data, prior search data, etc.) based on the identity, and suggests content 114 (e.g., advertisements) for presentation to the user 108. A presentation component 116 (e.g., as part of a graphics and display system) facilitates interactive (user interactions) presentation of the content 114 based on the proximity 106 and the identity of the user 108. The presentation component 116 receives the suggested content 114 from the content suggestion engine 110 and facilitates the interactive presentation of the content 114 based on the proximity 106 and the identity of the user 108.

The presentation component 116 changes characteristics (e.g., size, resolution, the content itself, etc.), of the content 114 based on corresponding changes in the proximity 106 of the user 108 to the device 104. In other words, as the user moves closer and farther from the device 104, the content 114 can correspondingly increase in size from its original size and decrease in size back to its original size. The suggestion engine 110 creates the suggestion based on the user information 112, which includes prior search history, user profile data, and social network data, for example.

The sensor subsystem 102 can further comprise a recognition subsystem that determines the identity of the user 108 using image recognition. The sensor subsystem 102 can further comprise a gesture recognition subsystem that facilitates user interaction with the content 114 via user gestures. The gestures can be natural user interface gestures such as hand movements and manipulations of one or more fingers.

The content 114 can relate to advertising, content specific to a visual environment (e.g., an operating system desktop) of the device 118, content specific to an application involved with current user interaction, content specific to a previous user web search, and/or content specific to user appearance (e.g., clothing, makeup, hairstyles, etc.). The suggested content 114 is viewed by the user 108, controlled by the user 108 in quantity (e.g., interacting to cause presentation of multiple types of content) being viewed, and interacted with by the user 108 without the user 108 being logged into the device 104. The device 104 can a public device (e.g., of a department store) that communicates the content 114 (e.g., clothing) to a personal user device (e.g., cell phone) of the user 108 for viewing and user interaction.

Following is a specific description of the disclosed architecture as applied to content that is advertising. However, it is to be appreciated that, as further described herein, the disclosed architecture can be applied to many different environments.

When the user moves a hand closer to the user device (without physically touching) advertisements relevant to the operating system background image (sometimes referred to "desktop wallpaper" or "wallpaper") and user's interest will grow (enlarge) in relation to the distance between the hand and device. At a certain distance (the "sweet spot" range, e.g., approximately 6-12 inches from the device), the advertisement will be enlarged to full size.

During the process of enlarging the advertisement, the content in the advertisement can change and transform during the change into more or less of the same category of content or completely different category of content based upon the size of the advertisement at that time.

The user can interact with the advertisement/device using NUI gestures to view additional advertisements. For example, by changing the number of fingers in one or both hands that are recognized, the number of advertisements related to the wallpaper (e.g., a cyclist riding a bicycle) can be shown. Advertisements can then rotate based upon changing data, user interest, and selection of different wallpaper backgrounds. For example, the advertisements can change for a corresponding change in the wallpaper (e.g., to a picture of friends camping). The advertisements shown can be selected based on the user's social network of friends (e.g., likes and related interest) in the wallpaper image, in addition to camping gear, the brand of which is identifiable in the image.

When the user has identified an advertisement/deal that is desired to be shared, saved, etc., the user can again use one or more NUI gestures to complete the action. In the case of saving a deal for later redemption, the user can gesture a NUI "flick" of their hand to toss the advertisement/deal into a save bucket. The user accomplishes this prior to physically contacting with the user device.

If the user decides to not act on the advertisement/deal that is presented, the user can dismiss the advertisement by continuing to move a hand closer to the user device. Once past (outside) the "sweet spot" distance range, the advertisement begins to physically reduce in size, as well as the information within. At a predetermined distance from the device (e.g., approximately one inch), the advertisement will have been reduced to its initial size, which can be a slight visual indication of a hotspot. Content (e.g., advertisements) is presented that is relevant and of value to the user's interests, prior to any physical engagement with the user device.

Following is a general description of the disclosed architecture as can be applied to various environments.

As previously described with advertising, facial recognition can be employed to present custom wallpaper and one or more interactable hotspots. The software/hardware capabilities of the device detect the user's specific facial features and present custom wallpaper. Since the wallpaper is specific to user, advertising information is targeted to them through the previous search history, profile, social networks, and an opt-in features the user has chosen regarding the desired targeted advertising.

Once the user has been identified, using hand proximity to the device and NUI gestures, the user can view and interact with those advertisements prior to physically touching or unlocking the device. The user proximity can be used to incrementally enlarge/reduce hotspots showing advertising deals and advertisements that are customized to the user and related to the context of the user wallpaper. This occurs before the user has physically contacted the user device and/or intentionally interacted with the device in any way at this time to cause any device functions or operations. The wallpaper selection, advertisements, deals, etc., can be targeted to the user based upon user profile data, previous research data, and social signals, for example. Hand gestures can cause the device to operate to reveal the number of advertisements/deals the user would like to view and to act on a particular deal.

When implemented with a mobile device operating system start page (initial page presented at the start of the application), facial recognition can be performed to present a custom start page. Hand/body proximity can be computed to reveal relevant content specific to a context as associated with a display object such as a tile (e.g., sports content will gradually increase in size showing sports related media specific to that user, an email program tile will increase in visual size to show most recent mail available to view, upcoming appointment or task notifications, etc.). Hand gestures can be used to act on a particular piece of proximity information.

When implemented with a computer operating system and third-party applications, hand/body proximity can be configured to reveal content specific to the application with which the user is currently interacting (e.g., a newspaper application tile gradually increases in size show content specific to a category and that content is relevant to the user's profile, surfing history, etc.). Hand gestures can be used to act on a particular piece of proximity information.

When implemented with searching, hand/body proximity can be used to reveal content specific to the search engine homepage photo image. Content related to the image can be based on user profile data, previous research, social signals, etc. Hand gestures can be used to act on a particular piece of proximity information.

When implemented in public spaces such as clothing stores, hand/body proximity can be used to reveal content specific to the user's appearance and items (e.g., clothing, hair style, cup of coffee, etc.). NUI methods (e.g., hand, arm, eye, voice, speech, sound, etc.) can be used to act on a particular piece of proximity information (information interactable based on the user proximity). Devices, personal and public, can be tablets, computers, large public display monitors, etc.

Figure 2:
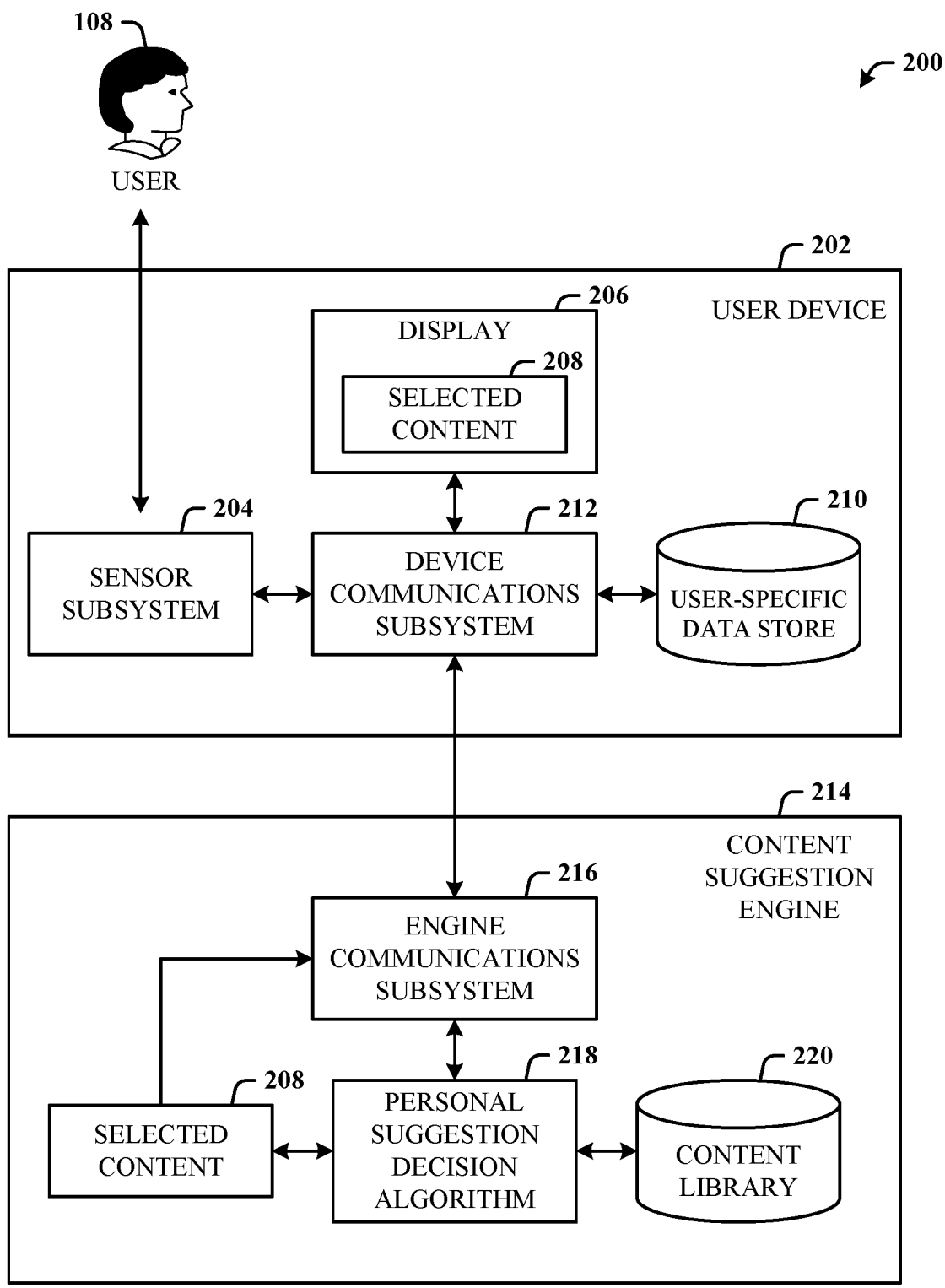
FIG. 2 illustrates a personal system of data and user interaction based on personal user device proximity.

FIG. 2 illustrates a personal system 200 of data and user interaction based on personal user device proximity. A user device 202 (a version of the device 104 of FIG. 1) includes a sensor subsystem 204 (similar to the sensor subsystem 102 of FIG. 1) that includes the capability to perform image (facial) recognition of the user 108, recognize user gestures, and determine the distance of the user and/or user extremities and body parts (e.g., hands, arms, etc.) from the device 202. The user device 202 includes a display 206 (similar to display 118) via which to present selected content 208 (similar to content 114). The user device 202 can also include a data store 210 that stores user-specific data such as profile information, social network information, login information, images, photos, messages, and the like. The user device 202 also includes a device communications subsystem 212 such as wired and/or wireless transceivers for connecting to wired and/or wireless networks or other systems.

The system 200 further includes a content suggestion engine 214 that analyzes and selects content (for display). In this depiction, the engine 214 includes its own engine communications subsystem 216; however, it is to be understood that communications can simply be by way of software send/receive techniques. The engine 214 includes a personal suggestion decision algorithm 218 that, based on at least the user identity and proximity, accesses a content library 220 and suggests the selected content 208 to be sent to the user device 202 for presentation.

In operation, as the user 108 moves close to the user device 202, the device 202 automatically analyzes and detects the identity of the user 108. Additionally, the user device 202 tracks the distance of the user 108 (or other body parts such as hand(s)) to the device 202. Based on the user identity detection and proximity, the device 202 automatically presents the selected content 208 to the user before the user touches the device 202. In this way, the user is presented with certain types of content 208 before logging in to perform other functions such as word processing, web searching, and so on, without having to view this content 208 in a distracting way while logged in. Based on the proximity of the user 108 to the device 202, the presentation of and/or the content 208 itself will be changed.

Thereafter, the user 108 can choose to interact with the content 208 and/or device 202 in some way by forming gestures that are recognizable to the device 202. Based on the gesture(s), the user 108 can interact in different ways, such as to save the content 208, bypass the content 208, move to different content, and so on.

Figure 3:
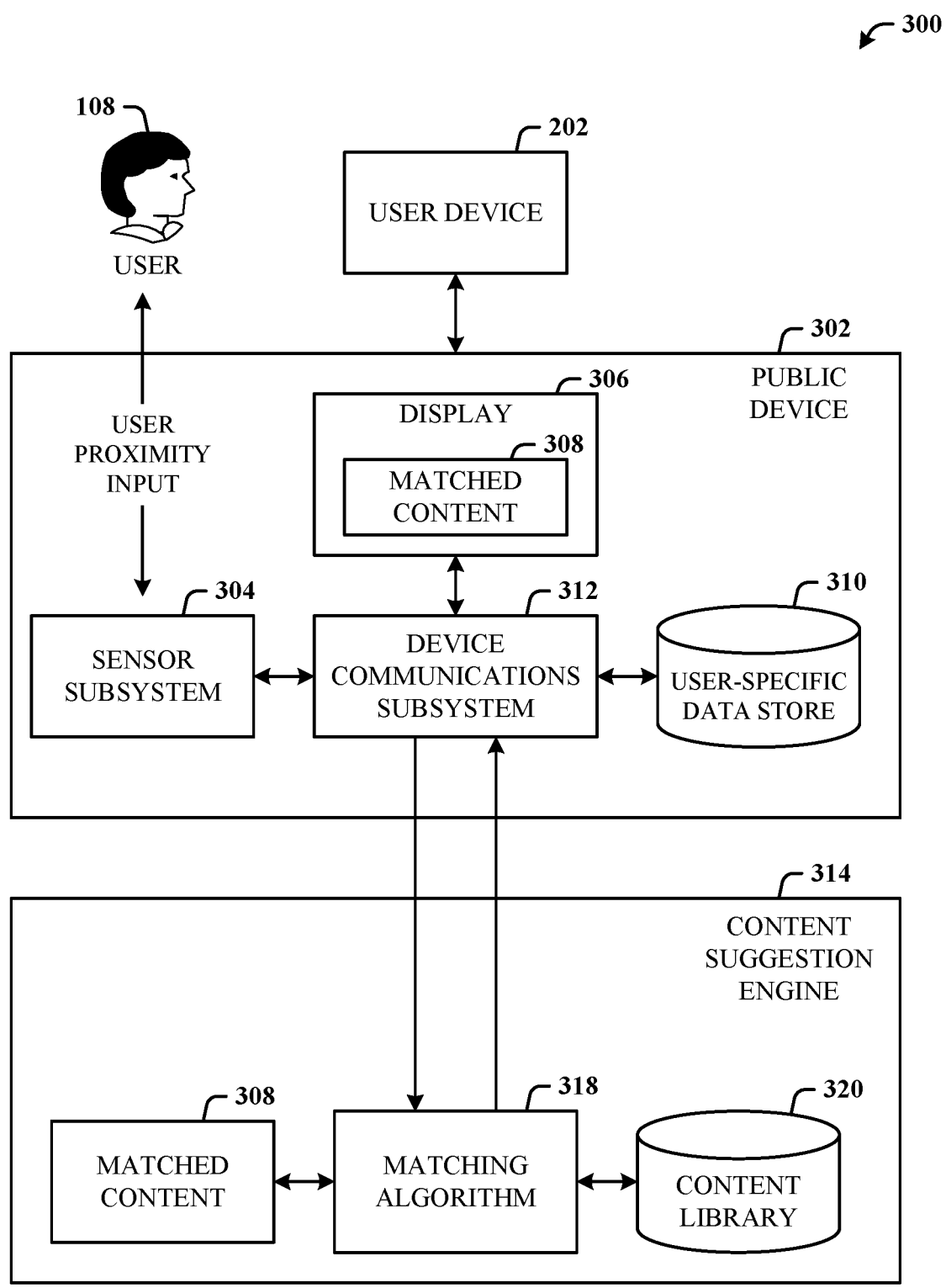
FIG. 3 illustrates a public system of data and user interaction based on public device proximity.

FIG. 3 illustrates a public system 300 of data and user interaction based on public device proximity. A public device 302 (a version of the device 104 of FIG. 1) includes a sensor subsystem 304 (similar to the sensor subsystems 102 and 204) that includes the capability to perform image (e.g., facial) recognition of the user 108, recognize user gestures, and determine the distance of the user and/or user extremities and body parts (e.g., hands, arms, etc.) from the public device 302. The public device 302 includes a display 306 (similar to display 118) via which to present matched content 308 (similar to content 114). The public device 302 can also include a data store 310 that stores user-specific data such as profile information, social network information, login information, images, photos, messages, and the like. The public device 302 can also include a device communications subsystem 312 such as wired and/or wireless transceivers for connecting to wired and/or wireless networks or other systems, such as the personal user device 202.

The system 300 further includes a content suggestion engine 314 that analyzes and selects matched content 308 (for display). In this depiction, the engine 314 communicates directly with the public device 302 using send/receive protocols rather than its own engine communications subsystem 212 as depicted in FIG. 2; however, it is to be understood that communications can by way of its own engine communications subsystem. The engine 314 includes a matching algorithm 318 that, based on at least the user identity and proximity data, accesses a content library 320 and suggests the matched content 308 to be sent to the public device 302 for presentation via the public display 306.

In operation, as the user 108 moves close to the public device 302, the device 302 automatically analyzes and detects the identity of the user 108. Additionally, the public device 302 detects the distance of the user 108 (or other body parts such as hand(s)) from the device 302 and then continually tracks the proximity of the user 108 to the device 302. Based on the user identity detection, the public device 302 automatically presents the matched content 308 to the user 108 before the user 108 touches the device 302. Presentation can be via the public device 302 and/or the user device 202, which is selectable by the user 108.

Based on the proximity of the user 108 to the public device 302, the presentation of and/or the matched content 308 can be changed. For example, where the public device 302 shows the user 108 in new apparel, the content 308 may be controlled to not clearly show the user 108 until the user chooses to use the public device 302 for viewing. This reduces or prevents viewing by other shoppers. Should the user choose to continue with the public device 302, as the user 108 moves closer to the device 302, the rendition of the user 108 can be more clearly shown (and viewed) in the display 306 wearing the new apparel.

Thereafter, the user 108 can choose to interact with the matched content 308 and/or public device 302 in some way by forming gestures that are recognizable to the public device 302. Based on the gesture(s), the user 108 can interact in different ways, such as to save the matched content 308, bypass the content 308, move to different content 308, and so on.

Alternatively, as previously suggested, the user 108 can choose to route the matched content 308 from the public device 302 to the user device 202 for more personal viewing and interaction. At this time, the user device 202 subsystems can take over (override) one or more of the public device 302 subsystems. For example, the user 108 can then interact via the user device 202. Additionally, the user device 202 can perform automatic matched content handling and presentation based on proximity of the user 108 from the user device 202.

The systems described herein can further employ a security component for authorized and secure handling of user information. The security component allows the subscriber to opt-in and opt-out of user identification and proximity tracking, for example, as well as personal user information processing. Consent can take several forms. Opt-in consent imposes on the subscriber to take an affirmative action before the data is collected. Alternatively, opt-out consent imposes on the subscriber to take an affirmative action to prevent the collection of data before that data is collected. This is similar to implied consent in that by doing nothing, the user allows the data collection and processing after having been adequately informed. The security component ensures the proper collection, storage, and access to the user information.

Figure 4:
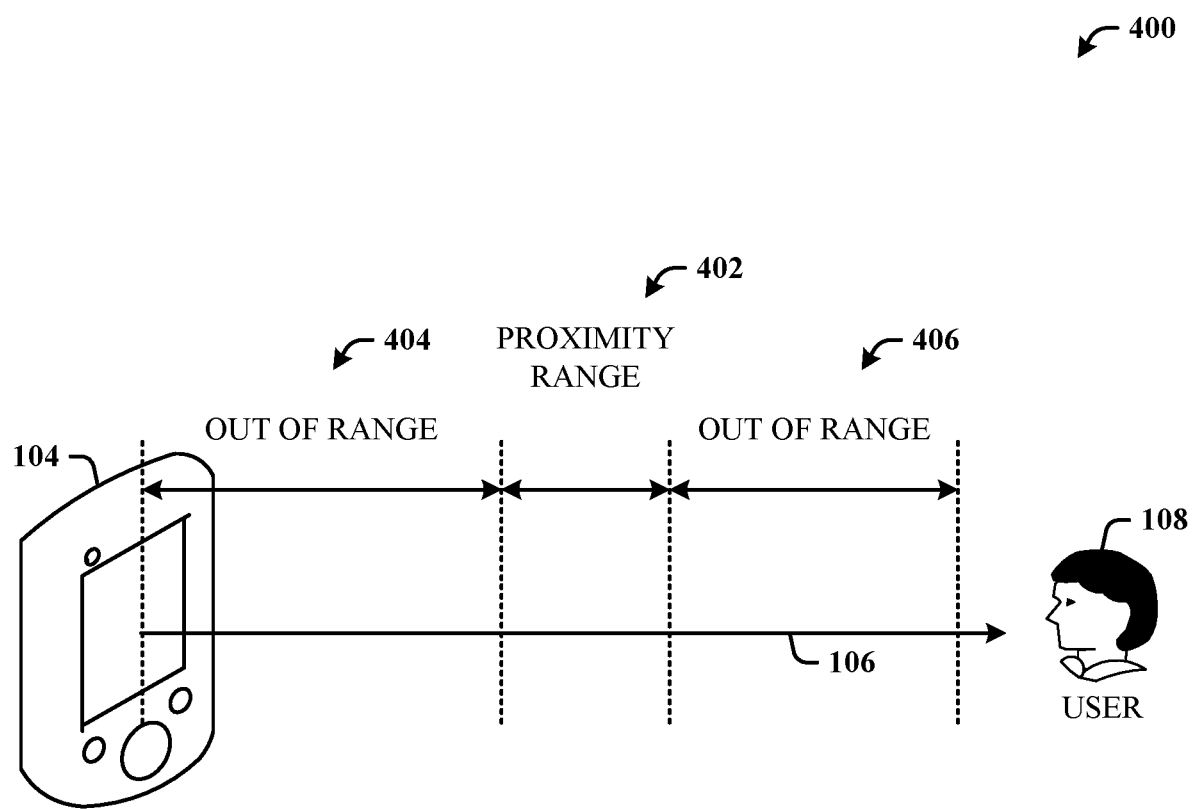
FIG. 4 illustrates a diagram of proximity analysis in accordance with the disclosed architecture.

FIG. 4 illustrates a diagram 400 of proximity analysis in accordance with the disclosed architecture. The device 104 includes the sensor capabilities to continually determine (track) the distance of the user 108 from the device 104. The "sweet spot" is the proximity range 402. In one implementation, the proximity range 402 is where the content is presented in its maximum enlarged view, whereas when user proximity 106 is within a close out-of-range (OOR) location 404 or a distant out-of-range location 406, the content is being correspondingly reduced back to its original viewing size or increased to the maximum viewing size.

In an alternative embodiment, as the user 108 moves closer to the device 104 while in the distant OOR range, the content is presented in an over-maximum viewing size so that the user can more easily view the content. Then, as the user 108 moves closer to the device 104, the content will be reduced to its maximum viewing size when the user 108 reaches the "sweet spot" proximity range 402. Essentially, the content is automatically adapted for user viewing as the user 108 moves closer to the device 104.

Figure 5:
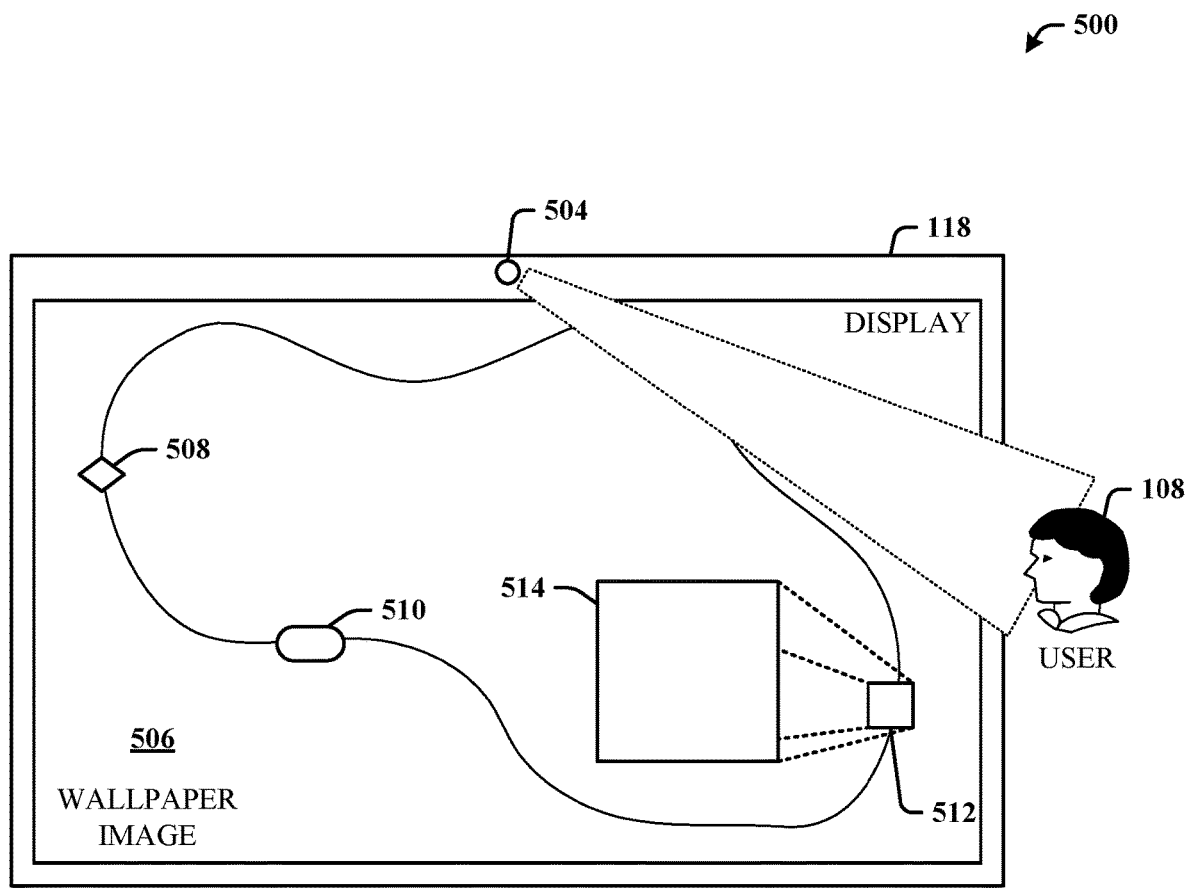
FIG. 5 illustrates a diagram of wallpaper and hotspot presentation based on user proximity.

FIG. 5 illustrates a diagram 500 of wallpaper and hotspot presentation based on user proximity. A device display 118 shows a wallpaper image in response to identification of the user 108 using at least facial recognition via a device camera 504. In response to user identification, the display 118 depicts a wallpaper image 506 derived from related preferences of the user 108. In this example, the wallpaper image 506 is presented with three interactive content hotspots: a first hotspot 508, a second hotspot 510, and a third hotspot 512. Each hotspot can have a different set of content for user interaction and display. For example, when the user 108 enters the "sweet spot" distance (proximity) of the device, the content associated with the third hotspot 512 can be increased to an enlarged version 514 for viewing by the user 108. As the user moves away from the display 118, out of the sweet spot distance range, the content is then reduced back down to the original size associated with the third hotspot 512. This technique applies equally to the first and second hotspots (508 and 510). This enlargement/reduction process is performed before the user 108 is logged into the device and before the user 108 physically touches the device. The user 108 can interact with the hotspots using natural user interface gestures such as hand and finger poses.

Figure 6A:
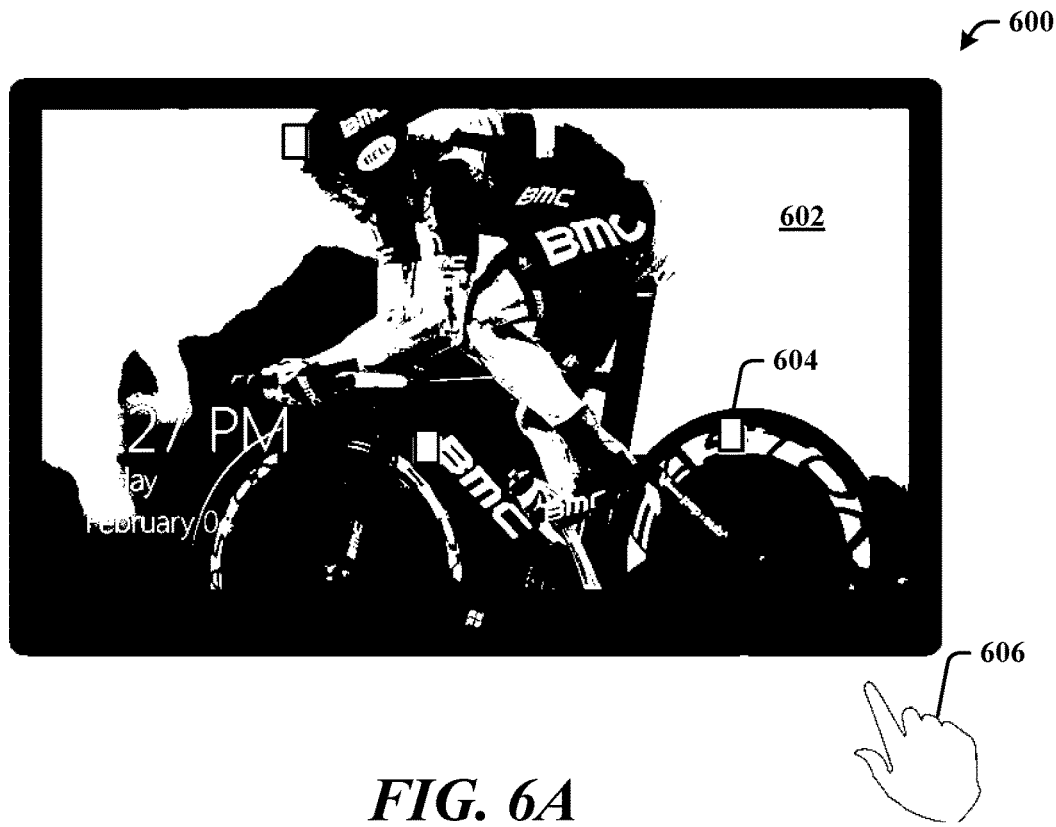
FIGS. 6A-6F illustrate a series of screenshots of interactions between a device and a user for wallpaper.

FIGS. 6A-6F illustrate a series of screenshots 600 of interactions between a device and a user for wallpaper. After the user is identified using facial recognition, a custom wallpaper 602 is presented, without the user contacting the device. FIG. 6A shows several hotspots created and located on the wallpaper 602. A first hotspot 604 is located on the rear wheel of the cycle, since the user is interested in cycling, as derived from the wallpaper image, and thus, content such as an advertisement for bicycle wheels/tires may be of interest. At this time, a user hand 606 is out-of-range of the proximity sweet spot. Thus, none of the hotspot content is being changed for viewing.

Figure 6B:
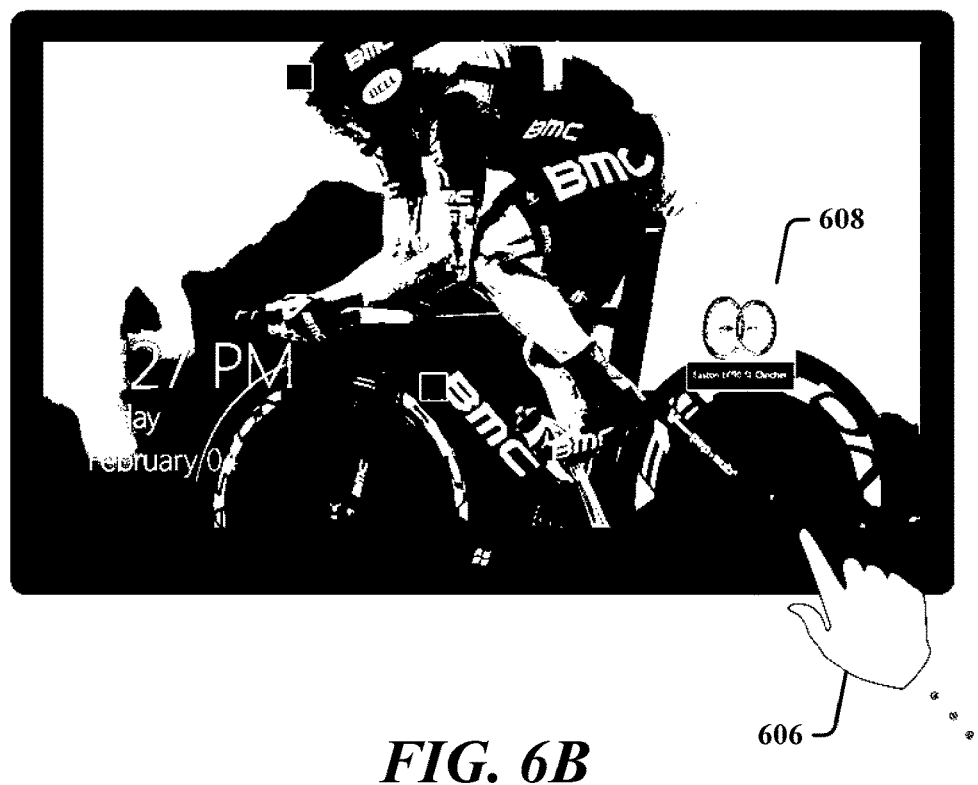
Figure 6C:
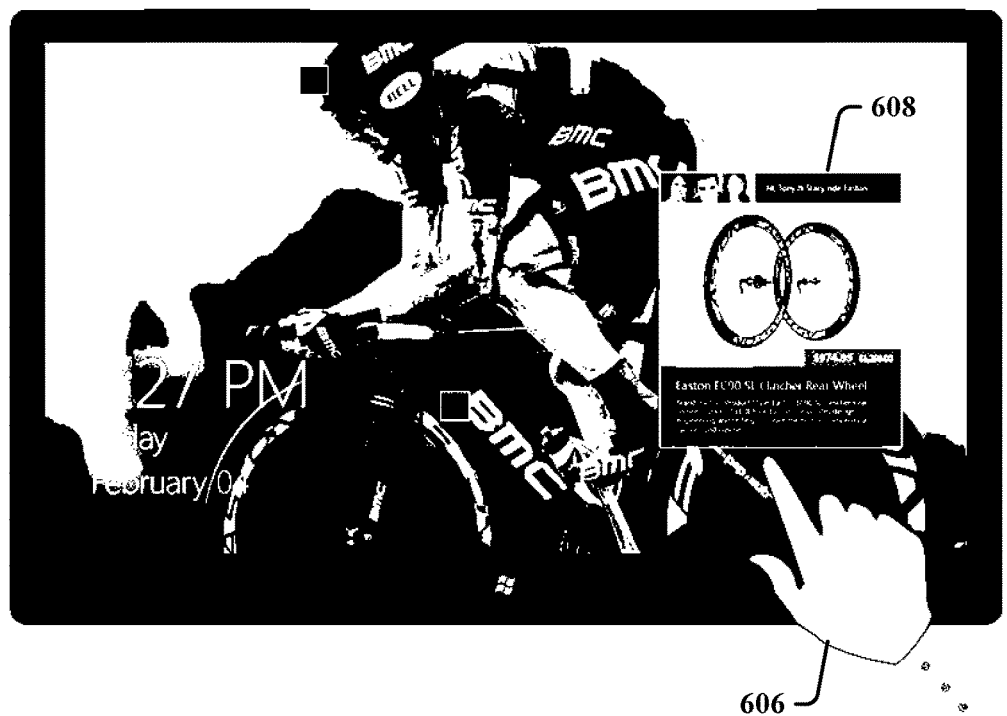
Figure 6D:
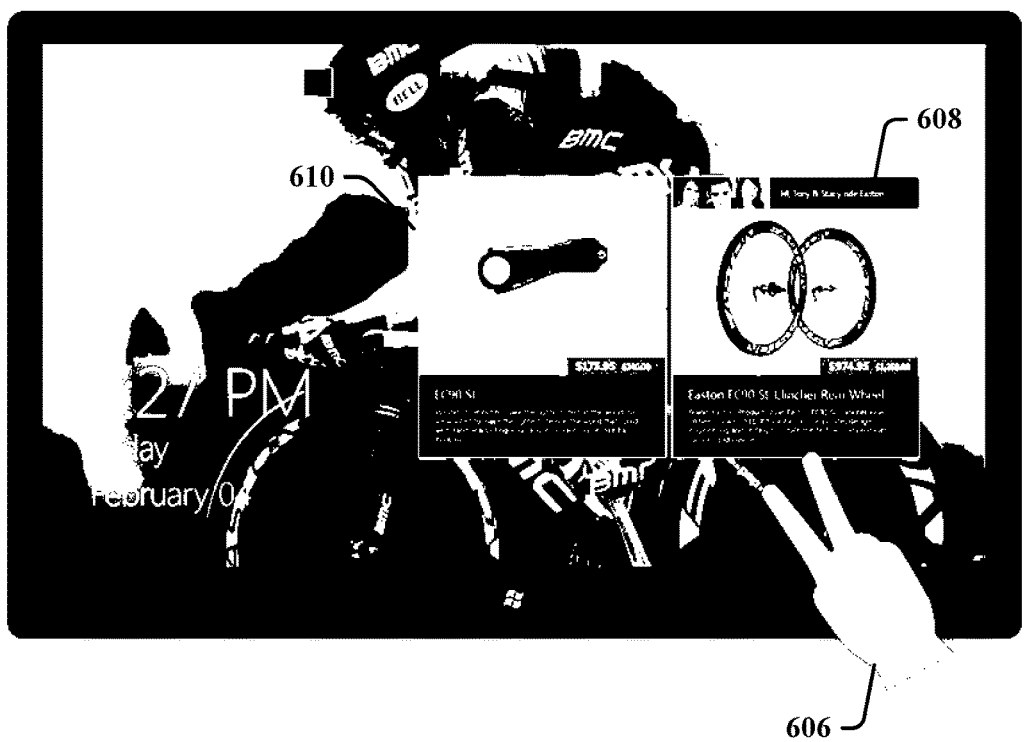
Figure 6E:
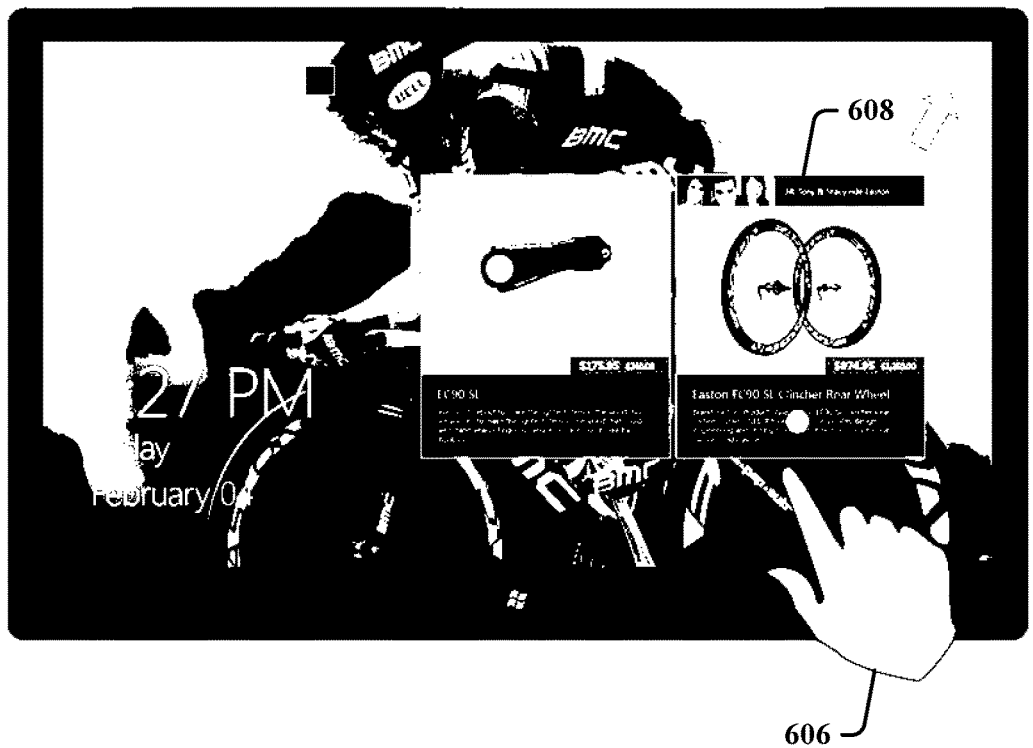
Figure 6F:
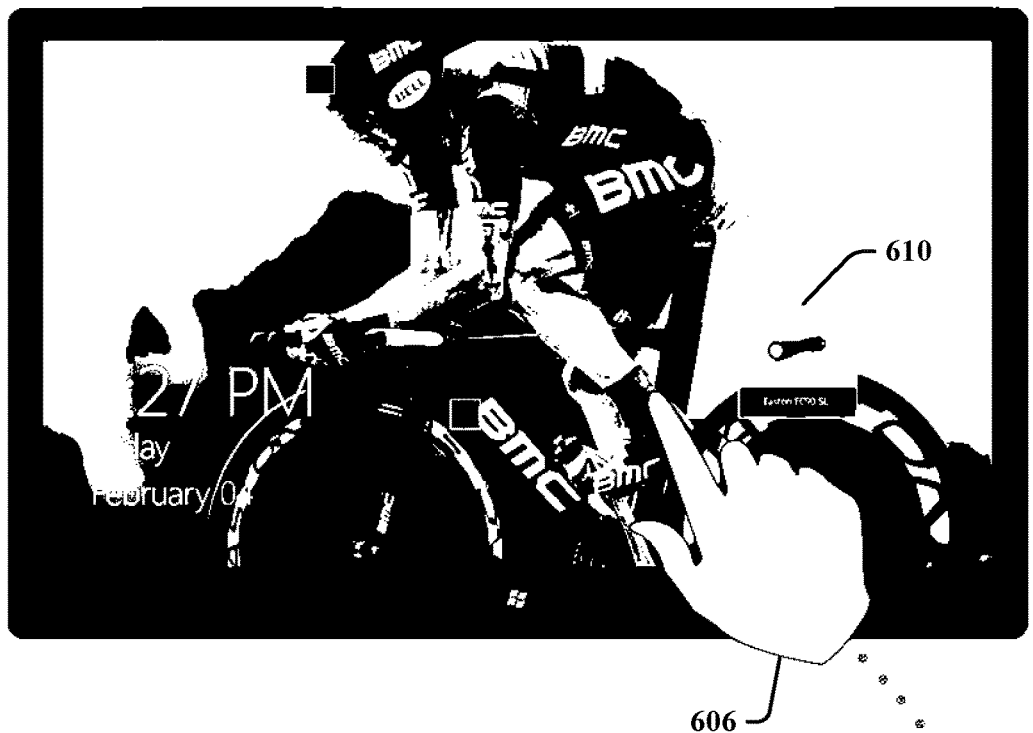

In FIG. 6B, as the user moves the hand 606 closer in proximity, a first piece of content 608 associated with the first hotspot 604 begins to grow larger with additional advertising and/or content information and deals. In FIG. 6C, when the hand 606 enters the predefined sweet spot proximity range, the first piece of content 608 is at its maximum size. In FIG. 6D, using gesture recognition, the user shows two fingers in the hand 606, which indicates the user wants to see another deal related to that first hotspot 604. In response, a second piece of content 610 is presented next to the first piece of content 608. In FIG. 6E, the user chooses to save the first piece of content 608 and makes a hand flick motion to the upper right corner towards a Save icon. This is a NUI gesture recognized as a save motion. The depiction of the first piece of content 608 is then removed, leaving the second piece of content 610 showing. In FIG. 6F, as the user moves the hand 606 still closer in proximity to the device (device display), into the close out-of-range location (location 404 of FIG. 4), the second piece of content 610 reduces in size. If the user touches the display, the second piece of content will have reduced to its original size (the size of the hotspot 604).

The same description applies for an application and a start page, where hotspots are presented, and user proximity cause content presentation and enlargement, reduction, saving, as above.

Figure 7A:
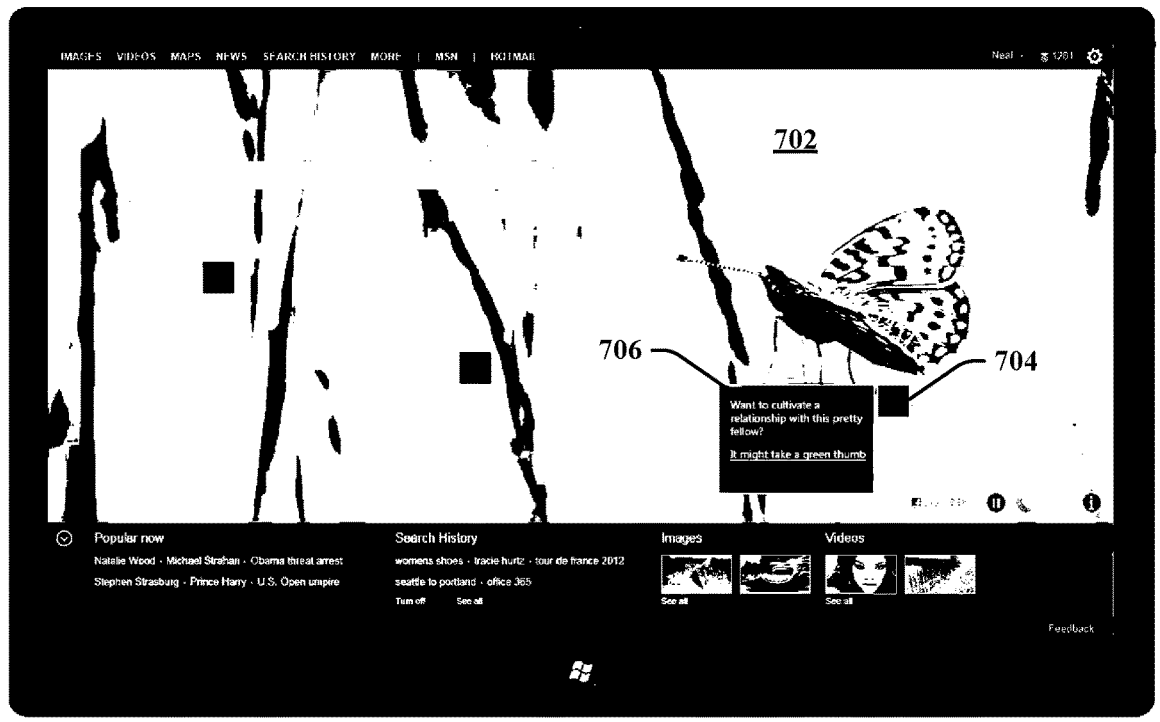
FIGS. 7A and 7B illustrate screenshots of interactions between a device and a user for a search engine page.
Figure 7B:

FIGS. 7A and 7B illustrate screenshots 700 of interactions between a device and a user for a search engine page 702. In FIG. 7A, the page 702 shows a first hotspot 704 and associated content 706. In FIG. 7B, as the user (user hand) moves closer in proximity to the device (display), the content 706 increases in size, and even changes to a different set of content.

Figure 8A:
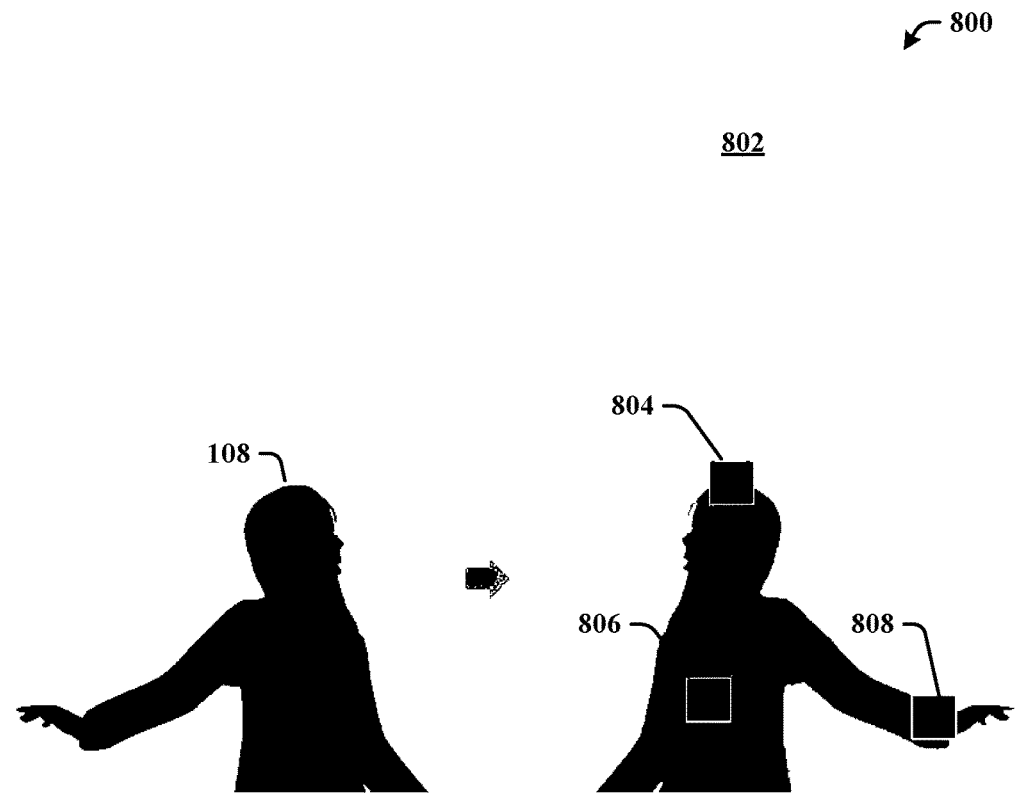
FIGS. 8A-8D illustrate screenshots of interactions using the disclosed architecture in a public clothing store.

FIGS. 8A-8D illustrate screenshots 800 of interactions using the disclosed architecture in a public clothing store. In FIG. 8A, the user 108 approaches a store display system 802, which identifies the user 108 and presents a generalized figure of the same gender back to the user with one or more hotspots: a head hotspot 804, and abdomen hotspot 806, and a hand hotspot 808. Other hotspots can be employed such as for the legs or feet, for example.

Figure 8B:
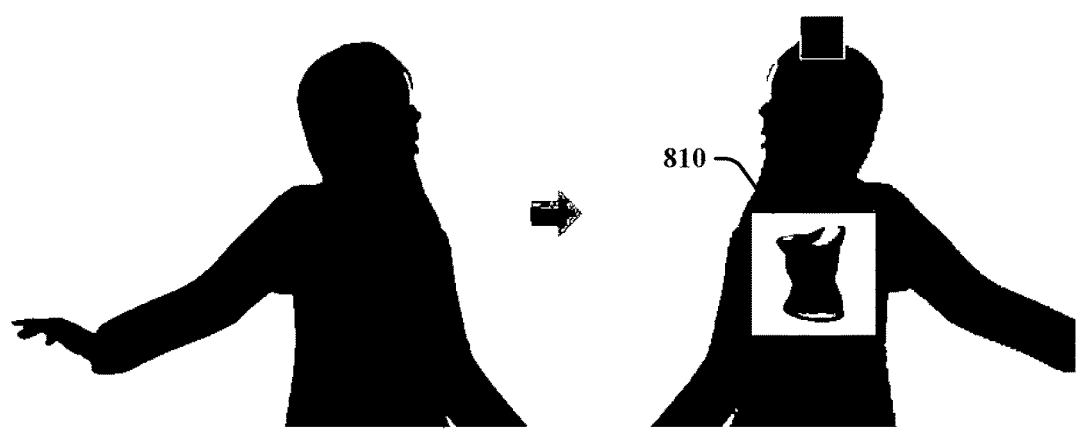

In FIG. 8B, as the user (user hand) moves closer a specific hotspot, for example the abdomen hotspot 806, the associated content 810 is enlarged to show a shirt (or other apparel) the user may like, based on user information obtained such as a user profile, social network information, prior search history, and so on, which may indicate the user was looking for a shirt.

Figures 8C, 8D:
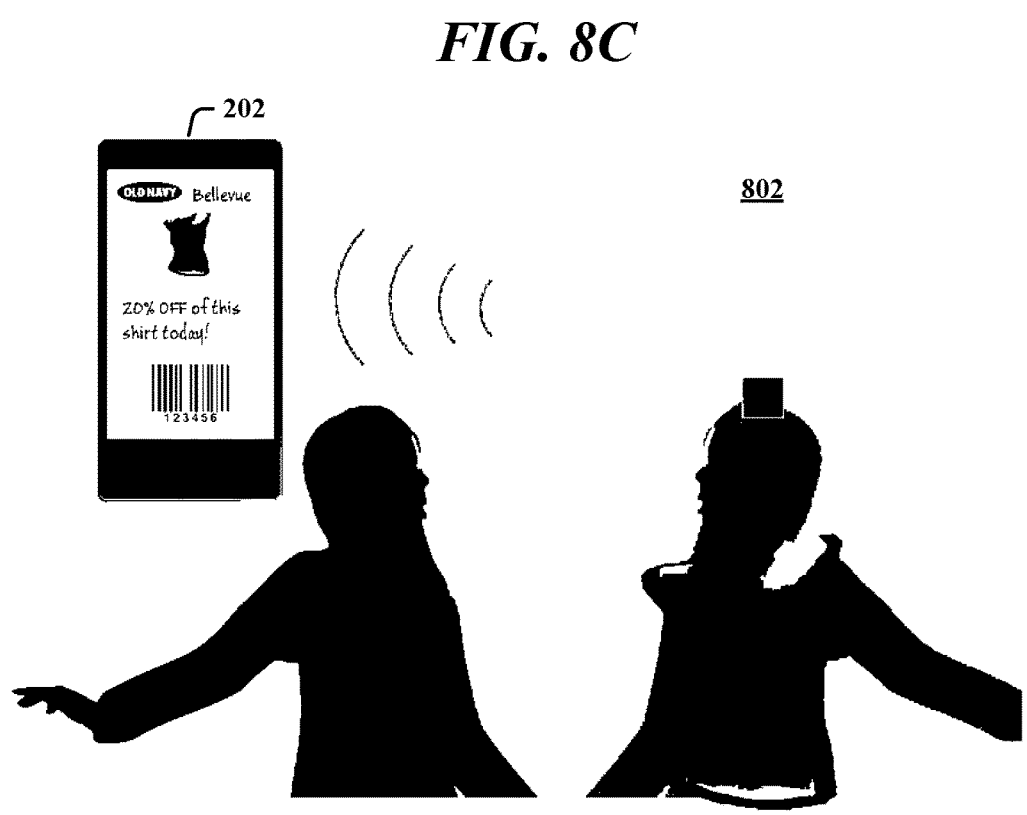

In FIG. 8C, when fully enlarged, based on the user hand proximity to the display system 802, the user 108 can see how the shirt would look when being worn. If the user likes the shirt, the user can gesture to select the content 810.

In FIG. 8D, in response to selection, the display system 802 (similar to the public device 302) can transmit more detailed information about the shirt to the user's personal device 202, such as any discounts, deals, etc. The user can then interact with the personal device 202 to complete the purchase transaction, look at other apparel, etc.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
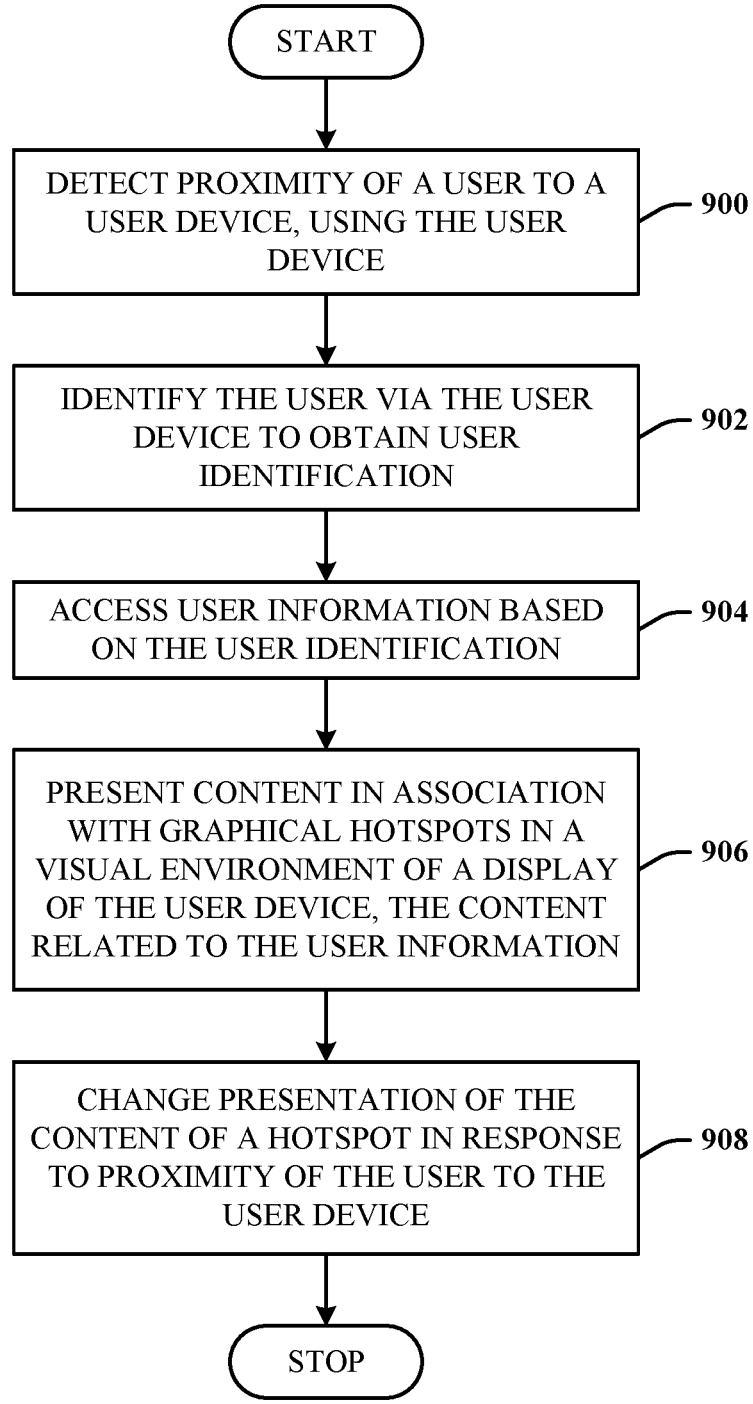
FIG. 9 illustrates a method in accordance with the disclosed architecture.

FIG. 9 illustrates a method in accordance with the disclosed architecture. The method can be performed by a computer system that executes machine-readable instructions. At 900, proximity of a user to a user device is detected using the user device. The proximity can be detected using one or more detection techniques such as sonic sensing and face recognition. When using the camera subsystem, repeated images can be captured and compared to a stored image (e.g., face) to determine the quality of the match. If the match fails, it can be decided that the user is too far away from the device for device operation to initiate.

Another technique is gesture recognition using natural user interface gestures to capture and interpret hand gestures, for example. If the user hand is captured and computed to be distant from the device, the content is presented in one way, whereas if the hand is captured and computed to be within a predetermined proximity range (also called a "sweet spot" or "sweet spot range") from the device, the content is presented in another way.

At 902, the user is identified via the user device to obtain user identification. For example, if facial recognition is employed, once recognition is computed to be successful, the identity of the user is known.

At 904, user information is accessed based on the user identification. The user information can be information obtained from local sources and/or remote sources. For example, the user information includes one or more of a user profile, social network data, and search information.

At 906, content is presented in association with graphical hotspots in a visual environment of a display of the user device. The content is related to the user information. The visual environment can be a wallpaper image selected by the user with the hotspots located at certain points on the wallpaper, a start page of an operating system, an application page, a search page, a public device application page, etc. At 908, the presentation of the content of a hotspot is changed in response to proximity of the user to the user device.

The method can further comprise processing user interaction with the user device by the user. The interaction employs gestures recognized within a predetermined proximity range (sweet spot) of the user device to operate the user device based on the user information. The method can further comprise processing user interaction to cause operation of the user device to present content to the user related to the user information. In other words, the content is targeted or customized to the user.

The method can further comprise processing user interaction to cause operation the user device according to gestures that zoom-in or zoom-out on the content. If the user hand is in the sweet spot range, the presence of the hand can cause the content to be enlarged (a zoom-in effect) for user perception. If the hand moves out of the sweet spot, the content is reduced back to its original size.

The method can further comprise processing user interaction to cause operation of the user device to present an advertisement to the user based on the user information. The method can further comprise interacting with the user device using natural user interface methods that include, but are not limited to, finger counts, hand swipes, finger pointing, etc.

Figure 10:
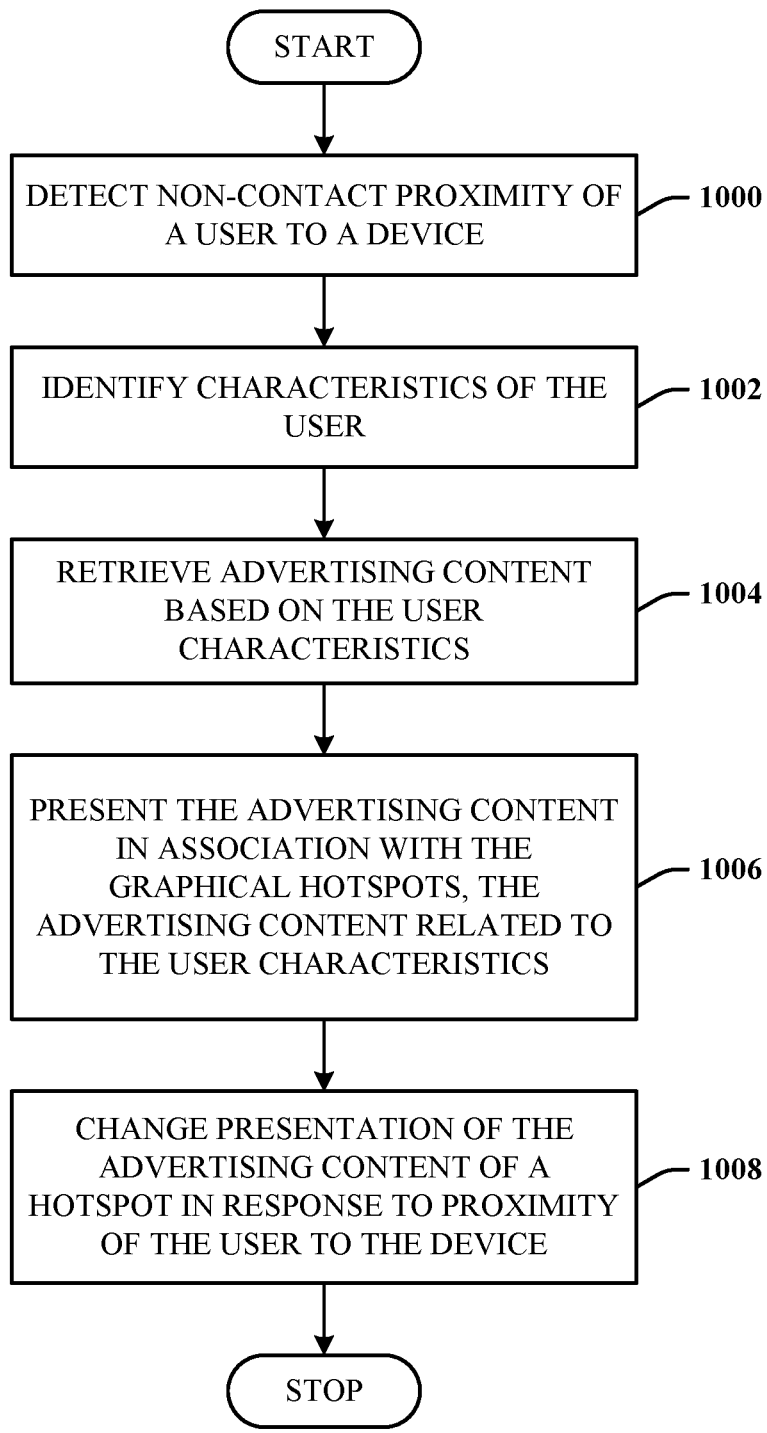
FIG. 10 illustrates an alternative method in accordance with the disclosed architecture.

FIG. 10 illustrates an alternative method in accordance with the disclosed architecture. The method facilitates the presentation of advertising content in association with graphical hotspots in a visual environment of a display of a device. At 1000, non-contact proximity of a user to the device is detected. At 1002, characteristics of the user are identified. The characteristics include, but are not limited to, clothing style at the moment, user profiles and preferences, hair color, hair style, age, hand movements, stride, gender identification, user identity (e.g., via image recognition, voice recognition, etc.), and so on. At 1004, advertising content is retrieved based on the user characteristics. At 1006, the advertising content is presented in association with the graphical hotspots, the advertising content related to the user characteristics. At 1008, the presentation of the advertising content of a hotspot is changed in response to the proximity of the user to the device.

The method can further comprise suggesting the advertising content to be presented based on the user characteristics, which include a related prior user search, user profile data, and social network data. The method can further comprise enabling user interaction to at least one of zoom-in on the advertising content of a hotspot, zoom-out on the advertising content of the hotspot, save advertising content of the hotspot, present additional advertising content in association with the hotspot, or transact the advertising content. The method can further comprise enabling user interaction with the advertising content of the graphical hotspots via user gestures of the user recognized within a predetermined proximity range of the user device. The method can further comprise enabling user interaction via a hand gesture that selects a specific hotspot of the visual environment for advertising content interaction. The method can further comprise identifying the user via the device a recognition technology (e.g., image, voice, speech, etc.).

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 11:
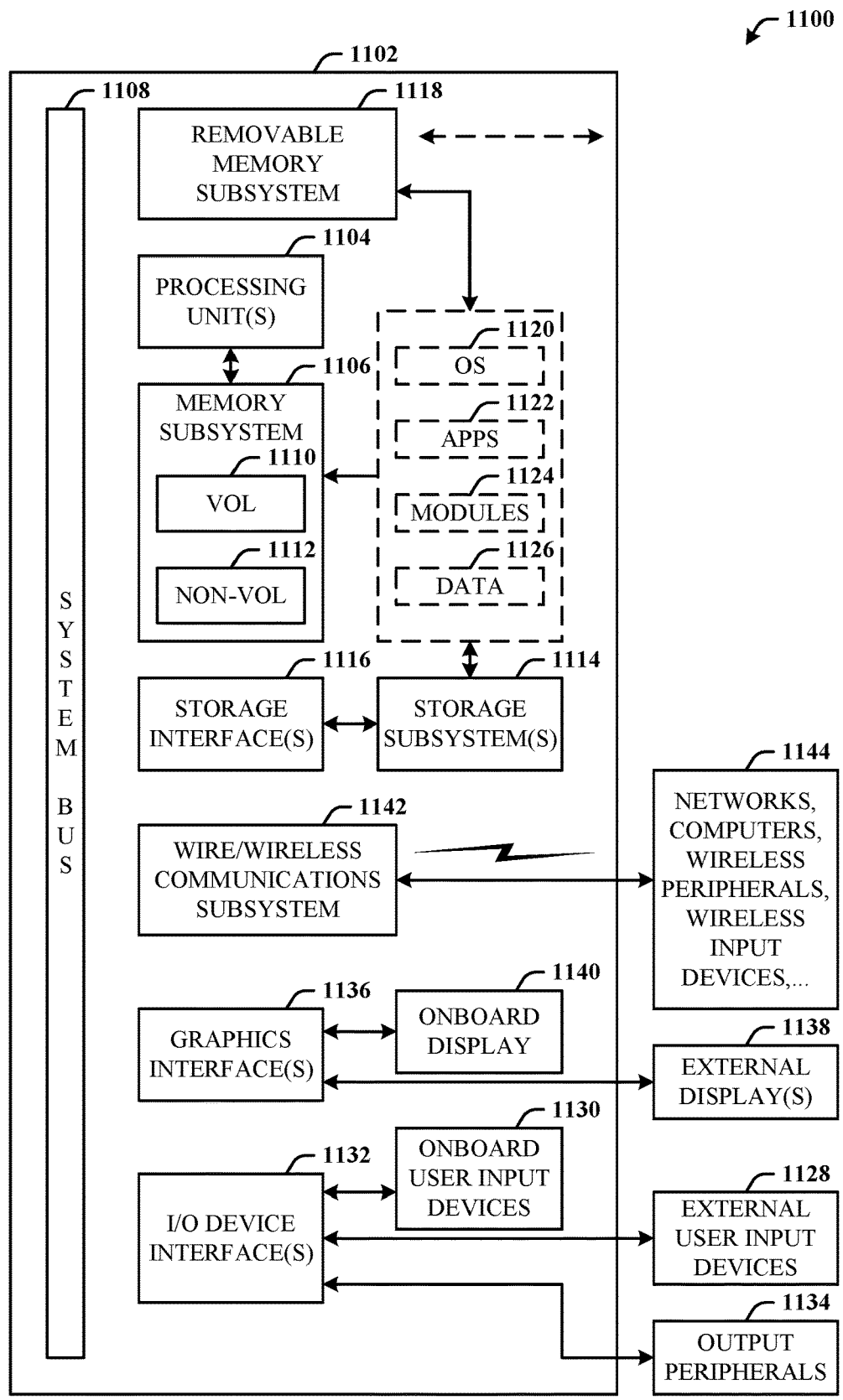
FIG. 11 illustrates illustrated a block diagram of a computing system that executes data and user interaction based on device proximity in accordance with the disclosed architecture.

Referring now to FIG. 11, there is illustrated a block diagram of a computing system 1100 that executes data and user interaction based on device proximity in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 11 and the following description are intended to provide a brief, general description of the suitable computing system 1100 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1100 for implementing various aspects includes the computer 1102 having processing unit(s) 1104 (also referred to as microprocessor(s) and processor(s)), a computer-readable storage such as a system memory 1106, and a system bus 1108. The processing unit(s) 1104 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 1102 can be one of several computers employed in a datacenter and/or computing resources (hardware and/or software) in support of cloud computing services for portable and/or mobile computing systems such as cellular telephones and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 1106 can include computer-readable storage (physical storage media) such as a volatile (VOL) memory 1110 (e.g., random access memory (RAM)) and non-volatile memory (NON-VOL) 1112 (e.g., ROM, EPROM, EEPROM, etc.). A basic input/output system (BIOS) can be stored in the non-volatile memory 1112 and includes the basic routines that facilitate the communication of data and signals between components within the computer 1102, such as during startup. The volatile memory 1110 can also include a high-speed RAM such as static RAM for caching data.

The system bus 1108 provides an interface for system components including, but not limited to, the system memory 1106 to the processing unit(s) 1104. The system bus 1108 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1102 further includes machine readable storage subsystem(s) 1114 and storage interface(s) 1116 for interfacing the storage subsystem(s) 1114 to the system bus 1108 and other desired computer components. The storage subsystem(s) 1114 (physical storage media) can include one or more of a hard disk drive (HDD), a magnetic floppy disk drive (FDD), solid state drive (SSD), and/or optical disk storage drive (e.g., a CD-ROM drive DVD drive), for example. The storage interface(s) 1116 can include interface technologies such as EIDE, ATA, SATA, and IEEE 1394, for example.

One or more programs and data can be stored in the memory subsystem 1106, a machine readable and removable memory subsystem 1118 (e.g., flash drive form factor technology), and/or the storage subsystem(s) 1114 (e.g., optical, magnetic, solid state), including an operating system 1120, one or more application programs 1122, other program modules 1124, and program data 1126.

The operating system 1120, one or more application programs 1122, other program modules 1124, and/or program data 1126 can include entities and components of the system 100 of FIG. 1, entities and components of the system 200 of FIG. 2, entities and components of the system 300 of FIG. 3, entities of the diagram 400 of FIG. 4, entities of the diagram 500 of FIG. 5, actions and results represented by the screenshots of FIGS. 6A-6F, actions and results represented by the screenshots of FIGS. 7A and 7B, actions and results represented by the screenshots of FIGS. 8A-8D, and the methods represented by the flowcharts of FIGS. 9 and 10, for example.

Generally, programs include routines, methods, data structures, other software components, etc., that perform particular tasks or implement particular abstract data types. All or portions of the operating system 1120, applications 1122, modules 1124, and/or data 1126 can also be cached in memory such as the volatile memory 1110, for example. It is to be appreciated that the disclosed architecture can be implemented with various commercially available operating systems or combinations of operating systems (e.g., as virtual machines).

The storage subsystem(s) 1114 and memory subsystems (1106 and 1118) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that does not employ propagated signals, can be accessed by the computer 1102, and includes volatile and non-volatile internal and/or external media that is removable or non-removable. For the computer 1102, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1102, programs, and data using external user input devices 1128 such as a keyboard and a mouse, as well as by voice commands facilitated by speech recognition. Other external user input devices 1128 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1102, programs, and data using onboard user input devices 1130 such a touchpad, microphone, keyboard, etc., where the computer 1102 is a portable computer, for example.

These and other input devices are connected to the processing unit(s) 1104 through input/output (I/O) device interface(s) 1132 via the system bus 1108, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1132 also facilitate the use of output peripherals 1134 such as printers, audio devices, camera devices, and so on, such as a sound card and/or onboard audio processing capability.

One or more graphics interface(s) 1136 (also commonly referred to as a graphics processing unit (GPU)) provide graphics and video signals between the computer 1102 and external display(s) 1138 (e.g., LCD, plasma) and/or onboard displays 1140 (e.g., for portable computer). The graphics interface(s) 1136 can also be manufactured as part of the computer system board.

The computer 1102 can operate in a networked environment (e.g., IP-based) using logical connections via a wired/wireless communications subsystem 1142 to one or more networks and/or other computers. The other computers can include workstations, servers, routers, personal computers, microprocessor-based entertainment appliances, peer devices or other common network nodes, and typically include many or all of the elements described relative to the computer 1102. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1102 connects to the network via a wired/wireless communication subsystem 1142 (e.g., a network interface adapter, onboard transceiver subsystem, etc.) to communicate with wired/wireless networks, wired/wireless printers, wired/wireless input devices 1144, and so on. The computer 1102 can include a modem or other means for establishing communications over the network. In a networked environment, programs and data relative to the computer 1102 can be stored in the remote memory/storage device, as is associated with a distributed system. It will be appreciated that the network connections shown are exemplary and other means of establishing a communications link between the computers can be used.

The computer 1102 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An augmented reality (AR) or virtual reality (VR) system comprising:
   a display;
   a sensor; and
   a processor that is operably coupled to the display and the sensor, where the processor is programmed to perform acts comprising:
      presenting a graphical object on the display, where the graphical object is configured to be interacted with by a user of the AR or VR system;
      outputting, by the sensor, first sensor data, where outputs of the sensor are indicative of positions of a hand of the user in an environment of the AR or VR system;
      detecting that the hand of the user is at a first position in the environment based upon the first sensor data output by the sensor;
      updating the graphical object on the display, where a feature of the graphical object, when updated, has a first value based upon the hand of the user being detected at the first position in the environment;
      subsequent to updating the graphical object on the display, outputting, by the sensor, second sensor data;
      detecting that the hand of the user is at a second position that is different from the first position based upon the second sensor data output by the sensor; and
      further updating the graphical object on the display, where the feature of the graphical content, when further updated, has a second value based upon the hand of the user being at the second position.

2. The AR or VR system of claim 1, wherein the feature of the graphical object is size of the graphical object.

3. The AR or VR system of claim 1, wherein the second position is closer to the AR or VR system than the first position, and further where size of the graphical object when the hand is at the second position is larger than size of the graphical object when the hand is at the first position.

4. The AR or VR system of claim 3, the acts further comprising:
   tracking the hand of the user as the hand of the user transitions from the first position to the second position based upon the outputs of the sensor; and
   enlarging the graphical object as the hand moves from the first position to the second position.

5. The AR or VR system of claim 1, wherein detecting that the hand of the user is at the first position comprises detecting that the hand of the user is a first distance from the AR or VR system based upon the first sensor data, and further wherein detecting that the hand of the user is at a second position comprises detecting that the hand of the user is a second distance from the AR or VR system based upon the second sensor data.

6. The AR or VR system of claim 1, the acts further comprising:
   determining an identity of the user of the AR or VR system, where the graphical content is displayed on the display based upon the identity of the user.

7. The AR or VR system of claim 1, the acts further comprising:
   detecting that a head of the user is at a first position; and
   displaying the graphical object with a second feature based upon the head of the user being detected at the first position.

8. The AR or VR system of claim 1, wherein the feature of the graphical object is resolution of the graphical object.

9. The AR or VR system of claim 1, the acts further comprising:
   subsequent to further updating the graphical content on the display, detecting a gesture performed by the hand of the user based upon third sensor data output by the sensor system; and
   in response to detecting the gesture, removing the graphical object from the display.

10. The AR or VR system of claim 1, wherein the feature is size of the graphical object, the acts further comprising:
    upon determining that the first position is within a first predefined range of distances from the AR or VR system, maintaining the size of the graphical object as a distance of the hand of the user from the AR or VR system changes; and
    upon determining that the second is within a second predefined range of distances from the AR or VR system, increasing the size of the content as the distance between the hand of the user and the display decreases.

11. A method performed by an augmented reality (AR) or a virtual reality (VR) system, the method comprising:
    displaying a graphical object on a display of the AR or VR system, wherein the graphical object has a first size when displayed on the display of the AR or VR system;
    generating, by a sensor of the AR or VR system, first sensor data, where outputs of the sensor are indicative of positions of a hand of a user of the AR or VR system;
    detecting that the hand of the user of the AR or VR system is at a first position based upon the first sensor data generated by the sensor;
    based upon the hand of the user being detected as being at the first position, updating the graphical object on the display such that the graphical object has a second size that is different from the first size;

subsequent to updating the graphical object on the display, generating, by the sensor of the AR or VR system, second sensor data;

detecting that the hand of the user of the AR or VR system as at a second position that is different from the first position based upon the second sensor data generated by the sensor;

based upon the hand of the user being detected as being at the second position, updating the graphical object on the display such that the graphical object has a third size that is different from the first size and the second size.

12. The method of claim 11, wherein the first position is closer to the display than the second position, and further wherein first size is larger than the second size.

13. The method of claim 12, further comprising:
tracking the hand of the user as the hand of the user moves from the first position to the second position; and
enlarging the graphical object on the display based upon the tracking of the hand of the user such that the graphical object is enlarged as the hand of the user moves closer to the display.

14. The method of claim 11, further comprising:
tracking a head of the user; and
altering position of the graphical object on the display based upon the tracking of the head of the user.

15. The method of claim 11, wherein detecting that the hand of the user is at the first position comprises detecting that the hand of the user is a first distance from the AR or VR system, and further wherein detecting that the hand of the user is at a second position comprises detecting that the hand of the user is a second distance from the AR or VR system.

16. The method of claim 11, further comprising:
obtaining an identity of the user of the AR or VR system, where the graphical content is displayed on the display based upon the identity of the user.

17. The method of claim 11, further comprising:
subsequent to updating the graphical object on the display such that the graphical object has the third size, detecting a gesture performed by the hand of the user; and
in response to detecting the gesture, removing the graphical object from the display.

18. An augmented reality (AR) or virtual reality (VR) system comprising:
a computer-readable storage medium comprising instructions that, when executed by a processor of the AR or VR system, cause the processor to perform acts comprising:

obtaining sensor data generated by a sensor of the AR or VR system over a window of time, where the sensor data generated by the sensor is indictive of positions of a hand of the user in an environment of the AR or VR system over the window of time;

tracking the hand of the user of the AR or VR system based upon the sensor data generated by the sensor of the AR or VR system, where tracking the hand of the user of the AR or VR system comprises detecting that the hand of the user transitions from a first position to a second position, where the first position and second position are at different distances from a display of the AR or VR system; and based upon the tracking of the hand of the user of the AR or VR system, modifying size of a graphical object displayed on the display as the hand of the user transitions from the first position to the second position.

19. The AR or VR system of claim 18, where first position is further from the display than the second position, and further wherein the graphical object is enlarged as hand of the user transitions from the first position to the second position.

20. The AR or VR system of claim 18, the acts further comprising:
tracking a head of the user; and
altering position of the graphical object on the display based upon the tracking of the head of the user.

* * * * *